United States Patent
Torii et al.

(10) Patent No.: US 9,388,845 B2
(45) Date of Patent: Jul. 12, 2016

(54) LOCKING SCREW

(75) Inventors: Shingo Torii, Ayabe (JP); Shinichi Hamano, Ayabe (JP)

(73) Assignee: NITTO SEIKO CO., LTD., Kyoto (JP)

( * ) Notice: Subject to any disclaimer, the term of this patent is extended or adjusted under 35 U.S.C. 154(b) by 206 days.

(21) Appl. No.: 13/261,649

(22) PCT Filed: Sep. 30, 2011

(86) PCT No.: PCT/JP2011/072500
§ 371 (c)(1),
(2), (4) Date: May 6, 2013

(87) PCT Pub. No.: WO2012/073589
PCT Pub. Date: Jun. 7, 2012

(65) Prior Publication Data
US 2013/0236264 A1 Sep. 12, 2013

(30) Foreign Application Priority Data
Nov. 30, 2010 (JP) .................................. 2010-267536

(51) Int. Cl.
*F16B 39/30* (2006.01)
*F16B 39/22* (2006.01)

(52) U.S. Cl.
CPC ................. *F16B 39/22* (2013.01); *F16B 39/30* (2013.01)

(58) Field of Classification Search
CPC ...... F16B 39/026; F16B 39/284; F16B 39/22; F16B 39/30; F16B 33/002; F16B 33/02; F16B 25/0047
USPC .................................... 411/366.1, 366.3, 411
See application file for complete search history.

(56) References Cited

U.S. PATENT DOCUMENTS

| 1,369,156 A | * | 2/1921 | Woodward | 411/307 |
| 1,953,095 A | * | 4/1934 | Baker | E21B 17/042 |
| | | | | 285/333 |
| 3,133,578 A | * | 5/1964 | Moskovitz | 411/309 |
| 3,323,402 A | * | 6/1967 | Gowen, Jr. | B21H 3/02 |
| | | | | 411/411 |

(Continued)

FOREIGN PATENT DOCUMENTS

| CN | 1487208 A | 4/2004 |
| CN | 201159232 Y | 12/2008 |

(Continued)

OTHER PUBLICATIONS

International Search Report dated Dec. 20, 2011 filed in PCT/JP2011/072500.

*Primary Examiner* — Gary Estremsky
(74) *Attorney, Agent, or Firm* — Rankin, Hill & Clark LLP

(57) ABSTRACT

A locking screw including a male screw and a female screw, the male screw being screwed into the female screw, the male screw including male threads and the female screw comprising female threads, wherein a male thread comprises a crest side flank surface and a root side flank surface connecting the crest side flank surface and a root of the male thread, a slope of the crest side flank surface is smaller than a slope of a female flank surface of the female thread, a slope of the root side flank surface is larger than the slope of the female flank surface, a connected portion of the crest side flank surface and the root side flank surface interferes with the female thread, and a clearance is formed between the root side flank surface and the female screw when the connected portion interferes with the female thread.

5 Claims, 6 Drawing Sheets

(56) References Cited

U.S. PATENT DOCUMENTS

| | | | | |
|---|---|---|---|---|
| 3,526,914 | A | * | 9/1970 | Breed .............................. 470/11 |
| 3,643,543 | A | * | 2/1972 | Gutshall ........................ 411/418 |
| 5,242,252 | A | | 9/1993 | Harle |
| 5,340,254 | A | * | 8/1994 | Hertel et al. ................... 411/311 |
| 5,738,472 | A | * | 4/1998 | Roopnarine et al. .......... 411/309 |
| 6,863,483 | B2 | * | 3/2005 | Koenig et al. ................. 411/311 |
| 7,731,466 | B2 | * | 6/2010 | Shea et al. .................. 411/366.3 |
| 2002/0131839 | A1 | * | 9/2002 | Kondo et al. ................. 411/308 |
| 2004/0037668 | A1 | | 2/2004 | Koenig |
| 2009/0116929 | A1 | * | 5/2009 | Shea et al. .................... 411/311 |

FOREIGN PATENT DOCUMENTS

| | | |
|---|---|---|
| EP | 0441224 A1 | 8/1991 |
| GB | 2198801 A1 | 6/1988 |
| JP | 63176810 A2 | 7/1988 |
| JP | 5196025 A2 | 8/1993 |
| JP | 6221319 A2 | 8/1994 |
| JP | 687713 | 12/1994 |
| JP | 11117929 A2 | 4/1999 |
| JP | 2002349536 A2 | 12/2002 |
| JP | 200997721 | 5/2009 |
| JP | 2010156436 A2 | 7/2010 |

* cited by examiner (A)
PRIOR ART (B)
PRIOR ART

LOCKING SCREW

BACKGROUND OF THE INVENTION (1) Field of the Invention

The present invention relates to a locking screw having peculiar threads for preventing a screw from loosening after a screw having a male screw at a leg thereof is screwed into a female screw hole so that a component part is fixed to a workpiece whose lower hole has a female screw previously formed thereat.

(2) Description of Related Art

In general, a digital camera, a mobile phone, a television game machine, and the like mostly adopt a small screw of M4 or less, in particular, out of so-called small screws having a nominal designation M10 of thread or less during assembling work. The use of these small screws is likely to be avoided because the use of a tapping screw that is to be screwed while forming a female screw possibly induces a deficient product such as a product for short-circuiting an electronic circuit caused by chips produced in forming the female screw since a product to be assembled incorporates therein a precise electronic component part. In view of this, a screw to be used in such a product is mostly a normal small screw under present circumstances.

However, as shown in FIG. 5, the above-described general small screw is designed to exhibit a locking function by the effect of a frictional resistance produced by the contact between a flank surface 121 of a female screw 120 and a flank surfaces 111 of a male screw 110 with each other, as shown in FIG. 6B, by an axial force generated between a seat surface of a head 102 and the flank surface 111 of the male screw 110 after tightening a screw during work for fixing a component part B to a workpiece W. The locking function can be exhibited when the seat surface of the head of a small screw 101 is screwed without suffering from any screw floating. However, initial looseness occurs in the case where the flank surfaces 111 and 121 are separated from each other due to vibrations exerted on the product, the shortage of tightening torque, or the like even if the separation is slight, as shown in FIG. 6A. After that, a locking force cannot be produced, and therefore, the screw 101 is slipped out of a screw hole 104. Under present circumstances, an adhesive, not shown, is applied to the male screw 110 at a leg 103 of the screw 101 in such a manner as to inhibit such looseness, and thus, the screw is used.

A screw having a male screw formed into a shape shown in FIG. 4 has been used in order to produce a locking function on a small screw with respect to a female screw. Such a screw is disclosed in Japanese Patent Application Laid-open No. Sho 63-176810. As shown in FIG. 4, an expanding portion 213 on a chasing side and an expanding portion 214 on an advance side that expand outward and have a predetermined thickness are formed at a crest of a thread at both flank surfaces of a thread, that is, a flank surface 211 on a chasing side and a flank surface 212 on an advance side at the crest of the thread formed around a shaft of a male screw 210. In this manner, locking portions are formed into a substantially rectangular cross-sectional shape at the crest. With this configuration, when this male screw is screwed into a female screw hole formed at a nut or a workpiece, the expanding portions 213 and 214 at the locking portion bite a root at the thread of the female screw with interference. Thus, the frictional resistance occurring at the bitten portion can prevent the male screw from loosening.

However, in the small screw whose leg has the adhesive adhering thereto so as to prevent any looseness in a generally wide use, the adhesive must be always applied to the leg of the screw before the screwing work, thereby requiring the applying process. In order to eliminate this process, the adhesive need be previously applied to the leg of the screw. For the purpose of this, special machining is needed to hold fluidity for a long period of time by preventing the adhesive from being dried. This induces an increase in cost. Moreover, in the case where the screw is slantwise screwed or the screw is floating so as to induce deficient screwing, when the deficiency is to be corrected, the adhesive has been already cured, and therefore, the screw cannot be loosened to be detached. If the screw is forced to be loosened, the head of the screw is crushed or the product is broken, thereby causing deficiency in the product. In the meantime, when the male screw having the expanding portions shown in FIG. 4 for the purpose of the prevention of the looseness is screwed into the female screw hole previously formed at the workpiece, the screw is screwed while the corners of the expanding portions are brought into contact with the female screw, and therefore, a scraping flaw occurs at the flank surface of the female screw, thereby raising a fear of a crush of the female screw. Moreover, in the case where the screw is screwed by an automatic driver such as an electric driver, the mismatch between the tip of the male screw and the female screw at the beginning of the screwing may crush the female screw. In addition, when the workpiece is made of a relatively soft material such as an aluminum alloy or a magnesium alloy, string-like chips are produced. The chips may fall on a wiring board for electronic equipment, and therefore, may adversely influence on an electronic component part, thus causing a deficient product. On the other hand, when the male screw is firmly tightened in the case where the workpiece is not made of a soft material, a tightening force from the flank surface on a female screw press-contact side concentrates on the expanding portion at the flank surface of the chasing side in press contact with the flank surface of the tightened workpiece. Consequently, the expanding portion at the flank surface on the chasing side of the male screw is plastically deformed into a flat surface along the flank surface on the female screw press-contact side. When this screw is repeatedly used, it can exhibit a great locking force for the first time. However, the expanding portion remains plastically deformed during the repeated use. Thus, a problem to be solved such as the degradation of the locking force still remains.

SUMMARY OF THE INVENTION

In view of the problem to be solved experienced by the prior art, an object of the present invention is to solve the above-described problem, and further, to provide a locking screw capable of securely achieving a locking function so as to reduce frictional chips produced by friction between a male screw and a female screw as much as possible.

In order to achieve the above-described object, a locking screw including a head 2 and a leg 3, the leg 3 having threads serving as a male screw 10 formed thereat, and the screw being screwed into a female screw hole 4 having a female screw 20 formed thereat, into which the male screw 10 can be screwed, wherein an angle $\beta°$ formed by flank surfaces 11 on a root side, forming a thread of the male screw 10 is smaller than an angle $\gamma°$ formed by both flank surfaces 21 and 21 constituting a root of a thread of the female screw 20 whereas a vertex $\alpha°$ formed by flank surfaces 12 and 12 on a crest side near the thread crest of the male screw 10 is an obtuse angle greater than 90°, and further, the flank surface 11 on the root side and the flank surface 12 on the crest side are connected to each other via an arcuate surface 14, the width A of the crest of the male screw 10 being greater than the width of the root of the female screw 20 mating with the male screw 10.

According to the present invention, a position at which the flank surface 21 of the female screw 20 and the flank surface 11 on the root side of the male screw 10 cross each other at a portion in press contact with the thread flank surface 21 of the female screw 20 in the state in which the thread of the male screw 10 is screwed into the female screw hole 4 is within a half of the crest of the thread with reference to the height of the thread of the male screw 10. Thus, the body of the female screw pushed away from the male screw on the crest side can be securely moved to a clearance defined between the male screw and the female screw. Moreover, according to the present invention, the male screw 10 starts with a substantially arcuate tip in the leg. Thus, it is possible to stabilize initial screwing of the male screw at the beginning of the screwing into the female screw.

According to the present invention, the male screw on the thread crest side is brought into contact with the female screw in such a manner as to push the flank surface of the female screw previously formed, and therefore, the flank surface of the male screw can securely interfere with the flank surface of the female screw hole, thus achieving the firm locking function. As a consequence, it is unnecessary to apply an adhesive to a leg of a screw, unlike in the prior art, without any process for applying an adhesive. Moreover, it is possible to dispense with a special processing for maintaining fluidity for a long period of time so as not to dry an adhesive that has been applied in advance, thereby reducing cost. Additionally, in the state in which the male screw interferes with the flank surface of the female screw, the body of a workpiece in press contact by the crest of the male screw is smoothly pushed away without cutting since the flank surface of the male screw on the crest side and the flank surface on the root side are connected to each other via an arc, so as to be stably moved to a clearance defined between the male screw and the female screw. In addition, the female screw cannot be cut out, and therefore, the female screw cannot be crushed. Moreover, no large frictional force occurs between the male screw and the female screw, thereby preventing any agglutination phenomenon therebetween. Even if the screw is deficiently tightened, the deficiency can be readily corrected without any crush of a head of a screw or any occurrence of a deficient crushed product. In the meantime, the locking function is exhibited on the male screw on the thread crest side, and therefore, the male screw can be efficiently brought into contact with the female screw in the female screw hole with interference, thus securely inhibiting looseness of the male screw with respect to the screw hole. In addition, the locking function is resistant against so-called later looseness when the screw is completely loosened to fall down even at the time of so-called initial looseness when the head of the screw is slightly separated from a component part. Furthermore, even if this screw is repeatedly used in the same screw hole, a satisfactory locking function can be produced, and further, few fine chips are produced between the female screw and the male screw due to friction. Additionally, since the thread of the tip of the leg is gradually changed from the substantially arcuate shape to the approximately complete thread shape from the tip toward the complete thread, the male screw bites the female screw at the time of the initial screwing smoothly along the female screw. In addition, even if the workpiece is made of a soft material, peculiar effects such as no elongated chips can be produced, unlike in the prior art.

BRIEF DESCRIPTION OF THE DRAWINGS

FIGS. 6A and 6B are cross-sectional front views showing essential parts of FIG. 5 in enlargement, wherein FIG. 6A shows the state in which a small screw is screwed into a female screw hole and FIG. 6B shows the state in which the small screw is completely screwed into the female screw hole.

DETAILED DESCRIPTION OF PREFERRED EMBODIMENT

Figure 1:
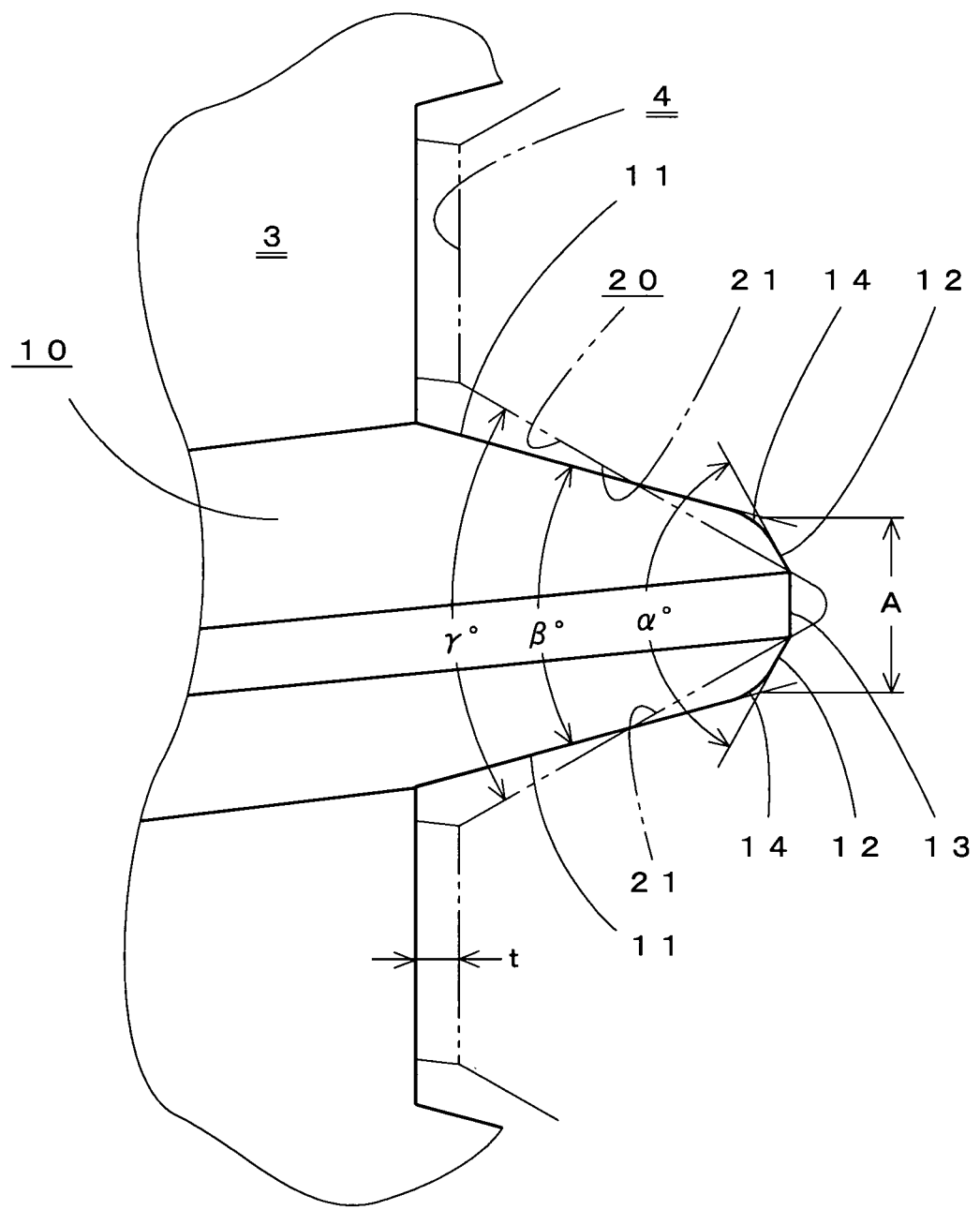
FIG. 1 is a front view showing, in enlargement, essential parts of a thread of a small screw according to the present invention.
Figure 2:
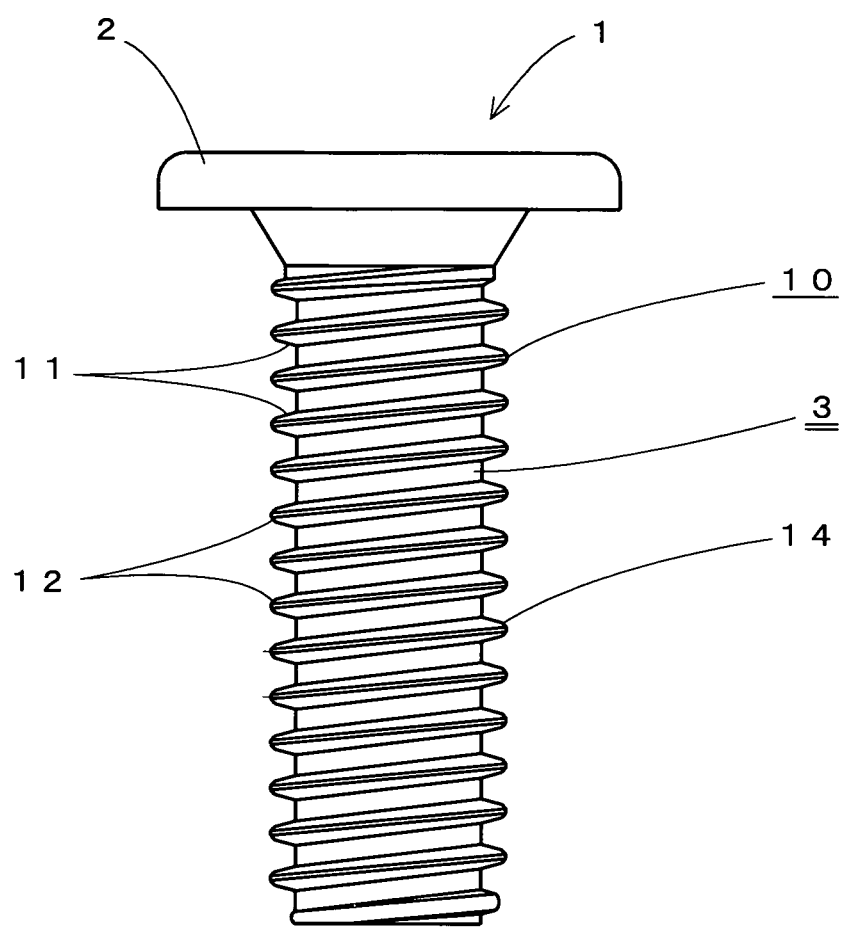
FIG. 2 is a front view showing the small screw in a preferred embodiment according to the present invention.
Figure 3:
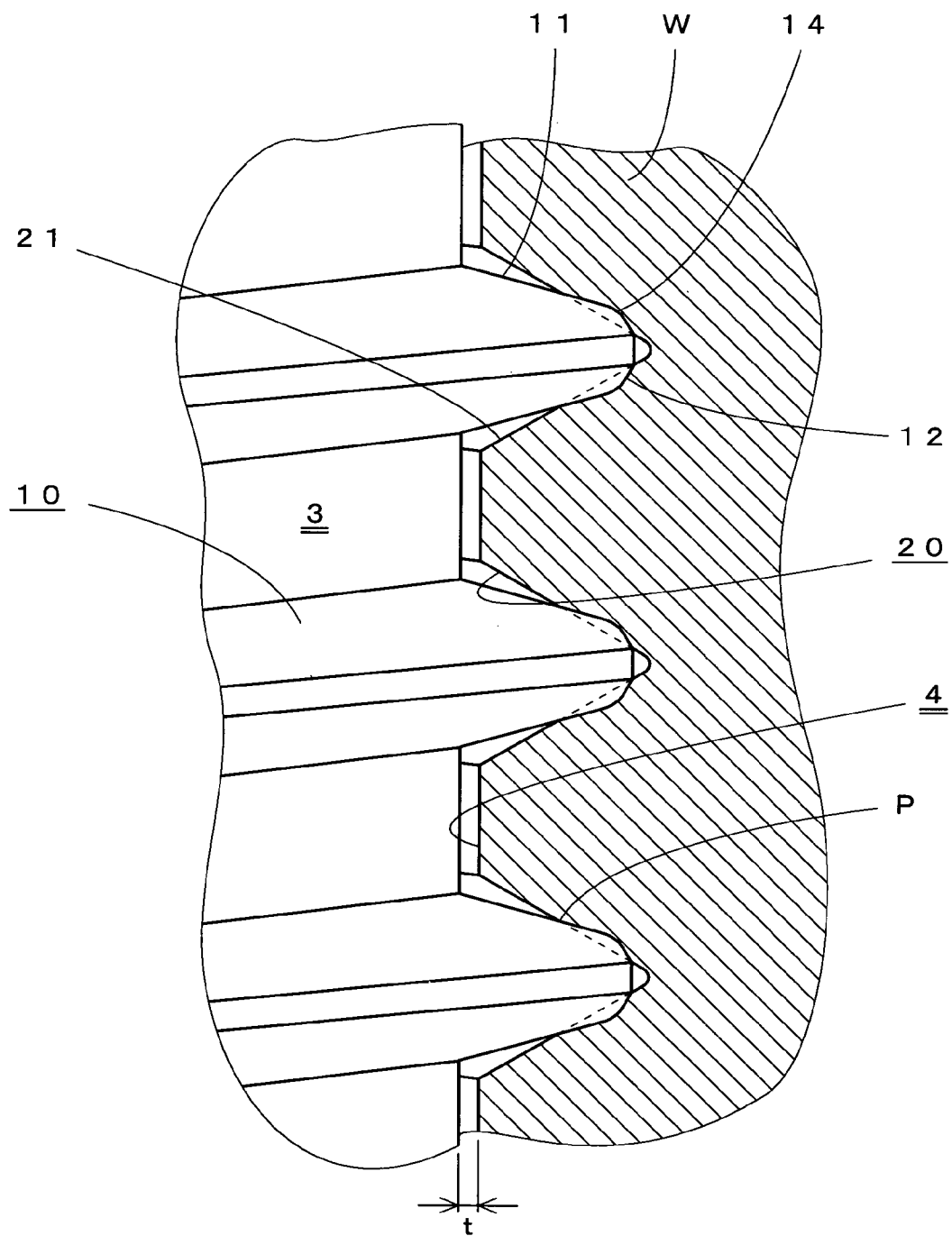
FIG. 3 is a partly cross-sectional view showing, in enlargement, the state in which the leg of the small screw is screwed into a female screw hole according to the present invention.
Figure 4:
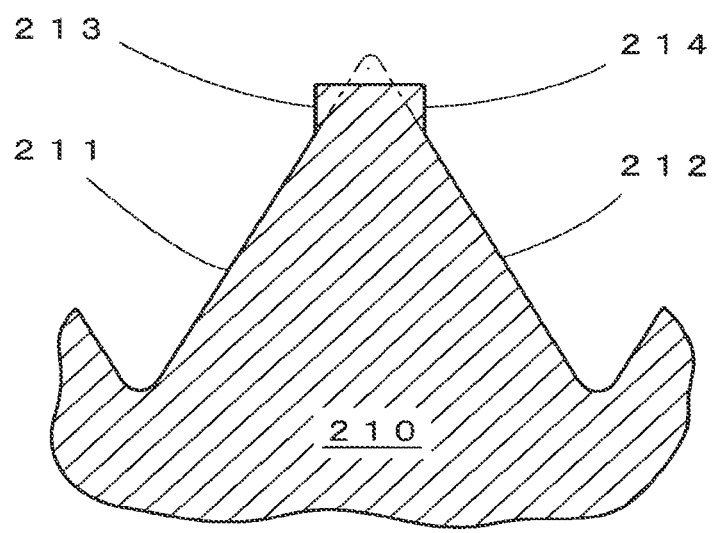
FIG. 4 is a cross-sectional view showing essential parts of a thread in the prior art according to the present invention.
Figure 5:
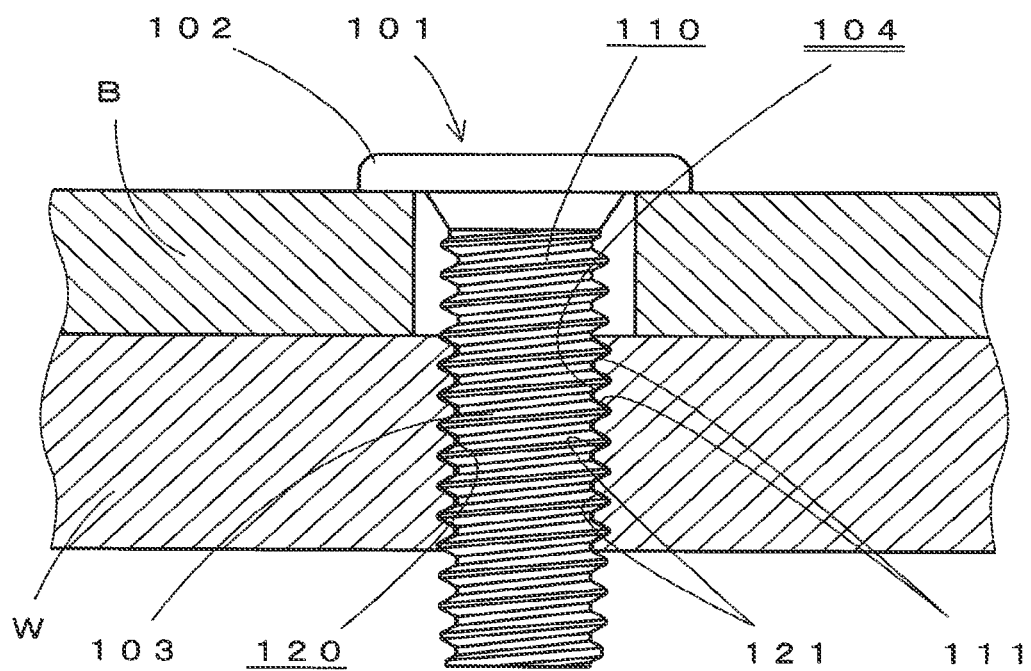
FIG. 5 is a cross-sectional view showing the state in which a small screw in accordance with the JIS is screwed into a female screw hole in another prior art according to the present invention.
Figure 6:
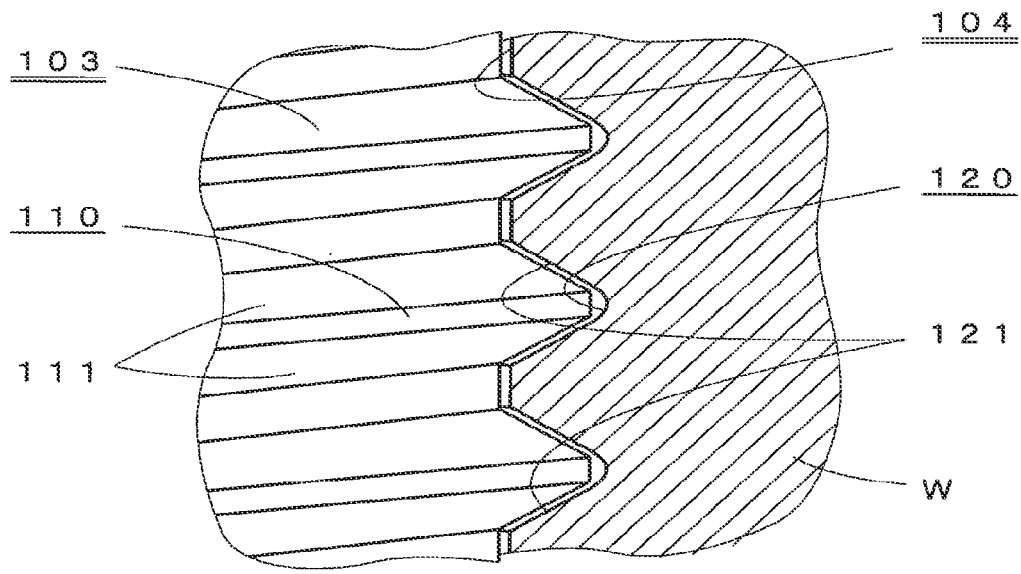
Figure 6:
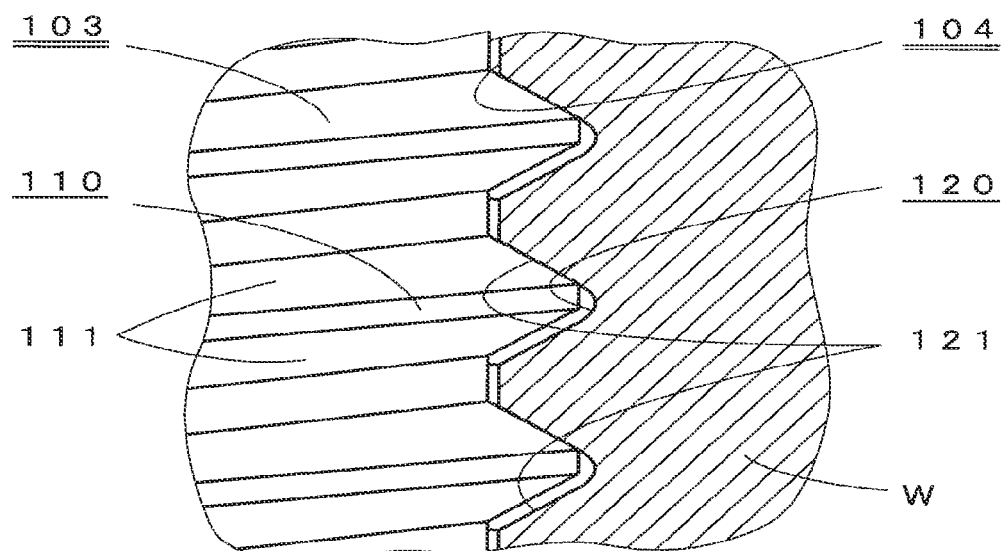

Hereinafter, a preferred embodiment according to the present invention will be described with reference to FIGS. 1 to 3. In FIGS. 2 and 3, reference numeral 1 designates a small screw including a head 2 having a cruciate drive hole, not shown, and a leg 3 formed integrally with the head 2. Threads serving as a male screw 10 are formed along the outer periphery of the leg 3. The threads of the male screw 10 are configured such that a drive force is transmitted from a driver bit, not shown, to a drive hole formed at the center of the head 2 so that the threads are screwed along a female screw 20 previously formed at a female screw hole 4 of a workpiece W. Basically, the dimension of the female screw 20 is independently set in accordance with the JIS (the Japan Industrial Standard) in a manner corresponding to the size (i.e., the nominal dimension) of the screw 1. The thread angle of the female screw 20 is normally 60°.

The female screw 20 formed at the female screw hole 4 normally has a size enough to engage with the male screw 10 capable of matching with the female screw 20. That is to say, the male screw 10 is adapted to be screwed into the female screw hole 4 having the female screw 20 having the nominal dimension defined under the JIS. With this same nominal dimension, a clearance t (see FIGS. 1 and 3) is defined between the crest surface of the female screw 20 and the root surface of the male screw 10. This clearance t is inevitably produced according to a dimensional tolerance set for each of the nominal dimensions of the female screw 20 and the male screw 10.

Moreover, the thread of the male screw 10 has an angle smaller than an angle γ° formed between flank surfaces 21 and 21 on both sides of the thread of the female screw 20. Specifically, as shown in FIG. 1, an angle β° formed between flank surfaces 11 and 11 on a root side, forming the thread on the base side of the male screw 10 is smaller than the angle γ° formed between both of the flank surfaces 21 and 21 constituting the thread of the female screw 20. In the present preferred embodiment, the angle γ° defined between both of the flank surfaces 21 and 21 of the female screw 20 is normally 60°, as described above. The angle γ° of the female screw 20 is 60°: in contrast, the angle β° formed between the flank surfaces 11 and 11 on the root side, forming the thread of the male screw 10 is 30°. Consequently, in the state in which the male screw 10 is screwed into the female screw 20, a triangular clearance also is formed on the base side of the thread of the male screw 10.

Additionally, the crest of the thread is formed such that it has a relatively greater thickness than that of a normal thread at a position corresponding to the outer diameter of the thread of the small screw in accordance with the JIS. In other words, a vertex α° defined by the flank surfaces 12 and 12 on the crest side, forming the thread crest side of the male screw 10 is an obtuse angle greater than 90°. A thread ridge forming the thread crest serves as a flat surface 13 having a slight width. The vertex α° formed by the flank surfaces 12 and 12 on the crest side, connected at one end thereof to the flat surface 13 is normally set to 120°.

The flank surface 11 on the root side and the flank surface 12 on the crest side are connected at an arcuate surface 14 having the arcuate cross-section of the thread crest in such a manner as to eliminate an intersection therebetween. With the above-described flank surface 12 on the crest side and the arcuate surface 14, the width of the crest of the male screw 10 including the flat surface 13 of the male screw 10, that is, a width A between the intersections is set to be greater than that of the root of the female screw 20 mating with the male screw 10. The width A of the crest is set to 6.5% of the nominal dimension of the screw. This value is introduced as the most optimum value from the experimental results in which the ratio of the width A of the crest with respect to the nominal dimension of the screw is variously set. If the value is greater than 6.5% with respect to the nominal dimension of the screw, the screwing resistance of the female screw becomes larger: in contrast, if it is smaller, the locking function becomes insufficient. As a result, the value of 6.5% is introduced as the most optimum value.

Moreover, as shown in FIG. 3, in the state in which the male screw 10 is screwed into the female screw hole 4, a position P at which the flank surface 21 of the female screw 20 and the flank surface of the male screw 10 cross each other at a portion at which the thread flank surface of the male screw 10 is brought into press-contact with the thread flank surface 21 of the female screw 20 is set to be within a half of the crest of the thread with reference to the thread height of the male screw 10. As a consequence, the body of the female screw 20 pushed away by the male screw 10 on the crest side is securely movable to the clearance defined between the male screw 10 and the female screw 20. As shown in FIG. 2, the male screw 10 positioned at the tip of the leg 3 starts with the arcuate portion having a small thread height, wherein the thread shape is gradually changed from a substantially arcuate shape to the thread shape at a thread rising portion from the tip toward the complete screw.

With the above-described configuration, when the small screw 1 mating with the female screw hole 4 is screwed, via the driver bit, into the female screw hole 4 previously formed, the threads formed in the leg 3 of the small screw 1 are started to be screwed along the female screw 20 in the female screw hole 4. At this time, the male screw 10 having the substantially arcuate tip at the leg 3 is fitted to the female screw 20 without biting at the beginning of screwing the small screw 1, and therefore, the thread is started to be screwed along the female screw 20. In this manner, the flank surface 12 on the crest side and flank surface 11 on the root side of the male screw 10 are brought into contact with the flank surfaces 21 of the female screw 20 on the crest side thereof while the small screw 1 is screwed into the female screw hole 4, as shown in FIG. 3, and thus, the thread of the female screw 20 on the root side interferes with the flank surface 12 on the crest side and the flank surface 11 on the root side of the male screw 10 on the crest side under pressure while the small screw 1 is screwed into the female screw hole 4. When the screwing work in this way causes screwing torque to reach a predetermined value, it comes to an end. Here, the flank surface 21 of the female screw 20 and the flank surface 12 on the crest side of the male screw 10 interfere with each other in the small screw 1, thereby producing a locking function.

The screw 1 is securely screwed to the workpiece W by repeating the above-described work. After that, if looseness occurs for some reason, the locking function is always produced in the screw 1, thus preventing the screw 1 from loosening and falling down. On the other hand, even if the screw 1 is found to be loosened, and then, is screwed again, the locking function can be satisfactorily exhibited. In particular, in the case where the screw is screwed to a workpiece W made of a soft material, it tends to receive a restoring force by the workpiece W. Consequently, the screw securely exhibits the locking function.

According to the present invention, the male screw 10 on the thread crest side interferes with the female screw 20 previously formed in press contact. Thus, the present invention is naturally applicable to a bolt to be used in fitting to a nut or the like other than the small screw.

What is claimed is:

1. A locking screw comprising a male screw and a female screw, the male screw being screwed into the female screw, the male screw comprising male threads and the female screw comprising female threads, wherein
   at least one of the male threads comprises a crest side flank surface and a root side flank surface connecting the crest side flank surface and a root of the male thread,
   a slope of the crest side flank surface is smaller than a slope of a female flank surface of the female thread,
   a slope of the root side flank surface is larger than the slope of the female flank surface,
   a connected portion of the crest side flank surface and the root side flank surface interferes with the female thread,
   a clearance is formed between the root side flank surface and the female screw when the connected portion interferes with the female thread, and
   a crest of the male thread is a flat surface which is configured such that an intersection between the flat surface and the crest side flank surface is brought into contact with the female flank surface.

2. The locking screw according to claim 1, wherein an angle of the intersection between the crest side flank surface and the root side flank surface is set to be an obtuse angle.

3. The locking screw according to claim 1, wherein the intersection between the crest side flank surface and the root side flank surface is formed to be an arcuate surface.

4. The locking screw according to claim 2, wherein the intersection between the crest side flank surface and the root side flank surface is formed to be an arcuate surface.

5. The locking screw according to claim 1, wherein an intersection between the root side flank surface and the female flank surface is set to be higher than a half of a height of the male thread so that the clearance is formed.

* * * * *